US010956674B2

(12) United States Patent
Astigarraga et al.

(10) Patent No.: US 10,956,674 B2
(45) Date of Patent: Mar. 23, 2021

(54) CREATING COST MODELS USING STANDARD TEMPLATES AND KEY-VALUE PAIR DIFFERENTIAL ANALYSIS

(71) Applicant: INTERNATIONAL BUSINESS MACHINES CORPORATION, Armonk, NY (US)

(72) Inventors: Tara Astigarraga, Fairport, NY (US); Saurabh Sinha, Danbury, CT (US); Vugranam Sreedhar, Yorktown Heights, NY (US); Michael Shane Goode, Sandy Springs, GA (US); John Jeffrey Dillon, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 16/155,877

(22) Filed: Oct. 9, 2018

(65) Prior Publication Data
US 2020/0110800 A1 Apr. 9, 2020

(51) Int. Cl.
G06F 17/00 (2019.01)
G06F 40/289 (2020.01)
G06Q 10/06 (2012.01)
G06Q 40/00 (2012.01)

(52) U.S. Cl.
CPC ........ *G06F 40/289* (2020.01); *G06Q 10/067* (2013.01); *G06Q 40/12* (2013.12)

(58) Field of Classification Search
CPC .......... G06Q 10/0635; G06Q 30/0206; G06Q 10/067; G06Q 40/12; G06F 40/289; G06F 40/186
See application file for complete search history.

(56) References Cited

U.S. PATENT DOCUMENTS

| | | | |
|---|---|---|---|
| 9,800,477 B2 | 10/2017 | Burton et al. | |
| 2004/0107189 A1* | 6/2004 | Burdick | .............. G06F 16/2237 |
| 2008/0027777 A1 | 1/2008 | Kimiya | |
| 2008/0183530 A1 | 7/2008 | Bagchi et al. | |
| 2009/0192867 A1* | 7/2009 | Farooq | ............... G06Q 30/0201 705/7.29 |

(Continued)

OTHER PUBLICATIONS

Knoll, T.M., "A combined CAPEX and OPEX Cost Model for LTE Networks"; IEEE (2014); 6 pgs.

(Continued)

*Primary Examiner* — Andrew T McIntosh
(74) *Attorney, Agent, or Firm* — Intelletek Law Group, PLLC; Gabriel Daniel, Esq.

(57) ABSTRACT

A contract generation system that automatically generates cost models for new business contracts is provided. The system receives a new contract comprising a set of key-value pairs, each key-value pair comprising a question and an answer that correspond to a field of information in a document for the new contract. The system computes a similarity measure between the new contract and an existing contract based on a set of variance definitions for determining differences between the set of key-value pairs of the new contract and a corresponding set of key-value pairs of the existing contract. The system generates a cost model of the new contract based on the similarity measure and a cost model of the existing contract.

20 Claims, 9 Drawing Sheets

(56) References Cited

U.S. PATENT DOCUMENTS

| | | | |
|---|---|---|---|
| 2009/0216545 A1* | 8/2009 | Rajkumar | G06Q 10/067 |
| | | | 705/348 |
| 2014/0149174 A1* | 5/2014 | Abbott | G06Q 10/0635 |
| | | | 705/7.28 |
| 2015/0356473 A1 | 12/2015 | Christiance et al. | |

OTHER PUBLICATIONS

Datta, P.P. et al., "Cost Modelling Techniques for Availability Type Service Support Contracts: A Literature Review and Empirical Study"; CIRP IPS2 Conference (2009); 8 pgs.

Oladokun, V.O. et al., "Unit Cost of Electricity in Nigeria: A Cost Model for Captive Diesel Powered Generating System"; Renewable and Sustainable Energy Reviews (2015); vol. 52, pp. 35-40.

Mell, P. et al., "Recommendations of the National Institute of Standards and Technology"; NIST Special Publication 800-145 (2011); 7 pgs.

\* cited by examiner

CREATING COST MODELS USING STANDARD TEMPLATES AND KEY-VALUE PAIR DIFFERENTIAL ANALYSIS

BACKGROUND

Technical Field

The present disclosure generally relates to automatic estimation of cost associated with business contracts.

Description of the Related Art

Contract costing is the tracking of costs associated with a specific contract with a customer. When a business enters a contract for which the company will incur costs in order to fulfill the terms of the contract, the business tracks the costs associated with that contract so that the business can justify its billings to the customer. Typically, a cost model is used to estimate the reimbursement from the customer to cover the costs.

SUMMARY

Some embodiments provide a contract generation system that automatically generates cost models for new business contracts. The contract generation system receives a new contract comprising a set of key-value pairs. Each key-value pair includes a question and an answer that correspond to a field of information in a document for the new contract. The system computes a similarity measure between the new contract and an existing contract based on a set of variance definitions for determining differences between the set of key-value pairs of the new contract and a corresponding set of key-value pairs of the existing contract. The system generates a cost model of the new contract based on the similarity measure and a cost model of the existing contract. The system also determines an efficiency offset based on a pattern of similarity between the key-value pairs of the new contract and the key-value pairs of the existing contract and applies the determined efficiency offset to the cost model of the new contract.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Contracts are often drafted using cost models that are created based on generic algorithms, personal experience, and institutional knowledge. For example, a product service department may rely on spreadsheets, individual user knowledge, and department specific algorithms to generate the cost models of new service contracts. Accounting-based cost models are frequently used to track the cost of operations related to a contract. Accounting-based cost models such as traditional costing and activity-based costing have unique advantages in terms of ease of implementation and accuracy, but they lack the ability to reliably model new opportunities and to provide quick and efficient upfront cost analysis for potential new engagements.

Some embodiments of the disclosure provide a method for generating cost models for new business contracts. The method utilizes paragraph by paragraph templates with blank fields (or "holes") to specify contract specific values within the contract document. The holes are associated with questions to solicit answers (by e.g., manual insertion, selection of menu options, etc.). The resulting new contract is then compared with existing contracts by differential analysis of key-value pairs that correspond to the questions and the answers of the holes. The differential analysis assigns a similarity measure between the new contract and the existing contract. In some embodiments, the similarity measure is calculated based on a set of variance definitions. The similarity measure allows similar contract to be identified and actual values of a first contract to be used in creating and calculating the cost model of a second contract. In some embodiments, the cost model of the new contract is adjusted according to a set of efficiency offsets, which accounts for savings that can be achieved due to similarity between the new contract and the existing contract.

Figure 1:
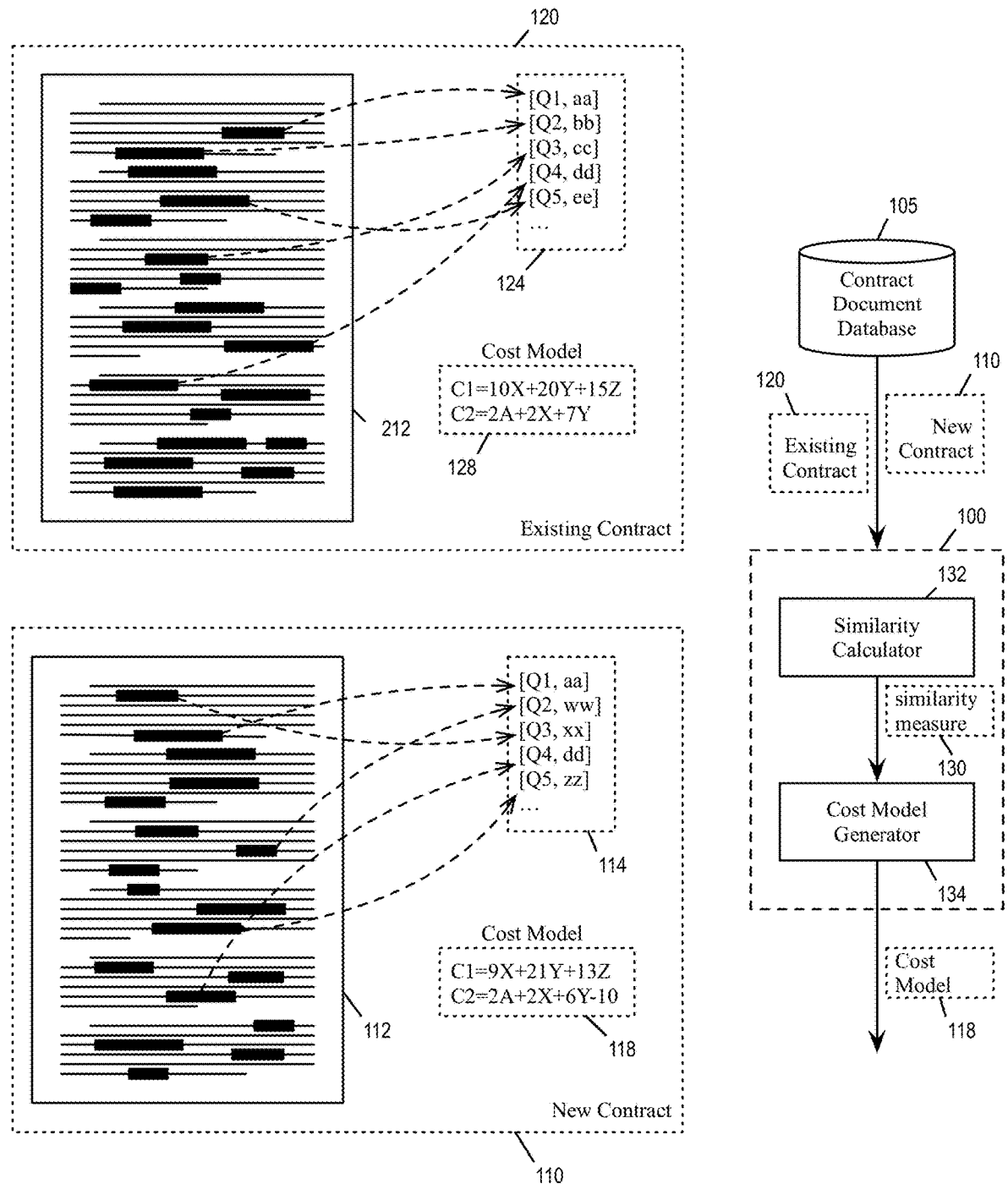
FIG. 1 illustrates a contract generation system that generates a new contract based on a similar existing contract.

FIG. 1 illustrates a contract generation system 100 that generates a new contract 110 based on a similar existing contract 120, consistent with an exemplary embodiment. The system 100 receives a proposed new contract 110 that is generated based on a template 112. The template 112 has holes that corresponds to various fields of information. For example, for an equipment service contract, the holes of the template may correspond to "length of service," "types of equipment," "number of equipment," etc. A sales representative of the organization entering the contract may fill out the various holes of the template manually, by answering questions, or by selecting an option from a menu of allowed options. For example, the sales representative may fill in "one year" for "length of service," "server array" for "type of equipment," "23 units" for "number of equipment," etc.

The filled-in content of the holes of the template 112 are stored as key-value pairs 114 for the new contract 110. Each key-value pair may be stored in a standard data structure format such as JSON, WL, or YAML. Each key-value pair in the set of key-value pairs 114 correspond to a hole or a field of information. A key-value pair includes a key and a value. The key of the pair may correspond to the question that is posed to the user to obtain the answer. The key may also be a label that is used to indicate to the contract generation system 100 what type of information is represented in the key-value pair. The value of the pair may correspond to the answer provided by the user when the question of the hole was posed. The value may also correspond to the text that appears on the eventual contract document generated by the system 100.

In order to complete the new contract 110, the contract generation system 100 computes various fees and costs for fulfilling the contract. The system 100 computes the various fee and costs of the new contract 110 by applying a cost model 118 to the terms of the contract 110. The contract generation system 100 generates the cost model 118 by selecting an existing contract from a contract document database 105 that is sufficiently similar to the current new contract 110. The selected contract 120 includes a cost model 128 and a set of key-value pairs 124. The set of key-value pairs 124 correspond to holes or fields of information of a template 122 that was used to create the existing contract 120. The cost model 128 is the model that was used to compute the various costs and fees of the existing contract 120. The system 100 determines the degree of similarity between the new contract 110 and the existing contract 120 by comparing the set of key-value pairs 114 with the set of key-value pairs 124. If the degree of similarity between the existing contract 120 and the new contract 110 indicates that the two contracts are sufficiently similar (e.g., if the degree of similarity is higher than a certain threshold) or if the existing contract 120 is the most similar contract of the new contract 110 (e.g., if the existing contract has higher degree of similarity with the new contract than other contracts stored in the database 105), the existing contract 120 is selected to serve as the architype for the new contract 110. The cost model 128 for the selected existing contract 120 is, in turn, used as the basis for generating the cost model 118 for the new contract 110.

The contract generation system 100 includes a similarity calculator 132. The similarity calculator 132 determines a similarity measure 130 between the set of key-value pairs 114 for the new contract 110 and the set of key-value pairs 124 for the existing contract 120. The determined similarity measure 130 is used to determine whether the existing contract 120 is sufficiently similar to the new contract 110 to serve as the archetype existing contract.

The contract generation system 100 also includes a cost model generator 134. The cost model generator 134 generates the new cost model 118 based on the existing cost model 128 and the similarity measure 130.

Figure 2:
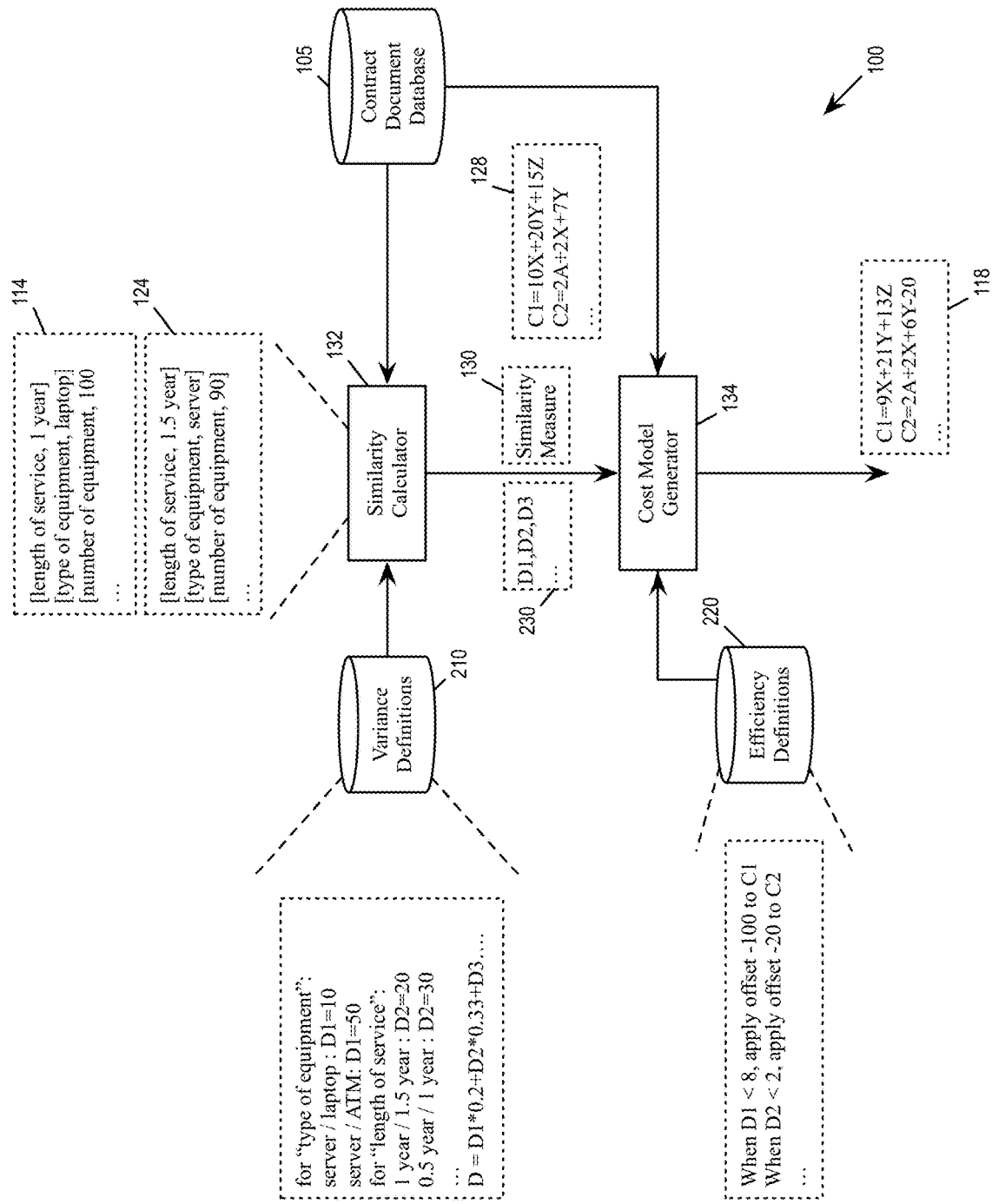
FIG. 2 illustrates determining the degree of similarity between two contracts.

FIG. 2 illustrates determining the degree of similarity between two contracts. As illustrated, the similarity calculator 132 compares the set of key-value pairs 114 of the new contract 110 with the set of key-value pairs 124 of the existing contract 120. The keys of the key-value pairs are used to match key-value pairs from the new contract with the key-value pairs of the existing contract (e.g., finding pairs with the same key or based on the same question.) The values of the matching key-value pairs are compared against each other. The comparison produces a similarity measure 130 for indicating the degree of similarity between the two contracts.

The values in the key-value pairs of the two contracts are compared and mapped into numerical distance values according to a set of variance definitions 210. For values that are in non-numerical terms, the variance definitions 210 may provide mapping from the non-numerical terms to numerical values in the context of the field of information (i.e., the key or question) or in the context of a domain that the new contract belongs to (e.g., sales contract for servers, service contract for laptops, etc.). The variance definitions 210 may map terms that are considered equivalent to have the same numerical value. For example, terms for related products, similar brands, product family, etc., may be considered equivalent.

The variance definitions 210 may also provide mapping that directly maps the difference between two non-numerical or numerical values into one numerical distance value. For example, for the key "type of equipment," the variance definitions 210 may map the difference between "server" and "laptop" as having a distance value of "10," the difference between "server" and "ATM machine" as having a distance value of "50." For the key "length of service," the variance definitions 210 may map the difference between "one year" and "1.5 year" as having distance value of "20" and the difference between "half year" and "one year" as having distance value of "30," etc. In some embodiments, the contract generation system 100 maintains multiple different sets of variance definitions for different domains of contracts. The similarity calculator identifies the domain of the contract and retrieve a set of variance definitions that correspond to the identified domain.

The similarity calculator 132 uses the distance values of the different key-value pairs to compose the similarity measure 130. The similarity measure 130 may be one single value or a matrix of values having different elements and dimensions. The similarity measure 130 may be a distance value (or a matrix of distance values) such that values closer to 0 indicate greater degrees of similarity than values further away from 0 (positive or negative). The similarity measure 130 may also be a similarity ratio such that values closer to 1.0 indicate greater degrees of similarity than values further away from 1.0. In some embodiments, the variance definitions 210 defines the similarity measure by e.g., providing a set of formula or a set of instructions that compute the similarity measure 130 from the distance values. In the example of FIG. 2, the variance definitions 210 numerically define how different possible values of the "type of equipment" field and the "length of service" field are mapped into different distance values (e.g., D1 and D2). The variance definitions 210 also defines the similarity measure D as a weighted sum of the distance values.

FIG. 2 also illustrates deriving the cost model of the new contract based on the cost model of the existing contract. As illustrated, the cost model generator 134 receives the cost model 128 of the existing contract 120 from the contract document database 105. The cost model generator 134 generates the cost model 118 based on the cost model 128 and the similarity measure 130. The cost model generator 134 may use the existing cost model 128 without alteration as the new cost model 118. The cost model generator may also use a modified version of the existing cost model 128 as the cost model 118 of the new contract, the modification being based on the similarity measure 130. In some embodiments, the cost model 118 of the new contract is computed as a multiplication product (e.g., dot product) of the cost model 128 of the existing contract and the similarity measure 130.

In some embodiments, the contract generation system 100 applies efficiency offsets to the cost model 118. When two contracts have a certain pattern of similarity, such as when the two contracts are identical in specific fields (key-value pairs), there can be efficiency savings due to reusable resources, already acquired knowledge, etc. For example, when the cost model of the existing contract includes the cost of hiring and training a group of new employees, the cost model of the new contract may apply efficiency offsets if the employees hired and trained for the existing contract is ready to be deployed for the new contract without further expenses.

In some embodiments, the cost model generator 134 is configured to apply efficiency offsets to the cost model of the new contract. The efficiency offset may be based on the distance values 230 calculated for different key-value pairs in 114 and in 124. The distance values 230 are used to identify which fields of information at which the two contracts have identical or sufficiently similar values. This provides the pattern of similarity for the cost model generator 134 to identify the efficiency offset.

The efficiency offsets applied are computed based on a set of efficiency definitions 220. The efficiency definitions 220 include formulas or instructions for computing efficiency offsets and for applying the computed efficiency offsets to different components of the cost model 118. The efficiency definitions may specify which distance values or which key-value pairs to examine. The efficiency definitions may assign different weights to different key-value pairs when determining the efficiency offset, as certain key-value pairs (fields of information) are more sensitive to differences/similarities and result in larger efficiency offsets. For example, a key-value pair related to setting up a new support center in an area where one may not exist would be weighed more in efficiency offset calculation than a key-value pair related to providing additional training to staff that already are present in a support center at the intended location.

In the example of FIG. 2, the cost model generator 134 uses the distance values D1 and D2 provided by the similarity calculator 132 to determine the efficiency offset to be applied to cost components C1 and C2 according to the efficiency definitions 220. In some embodiments, the contract generation system 100 maintains multiple different sets of efficiency definitions for different domains of contracts. The similarity calculator identifies the domain of the contract and retrieves a set of variance definitions that correspond to the identified domain.

Figure 3:
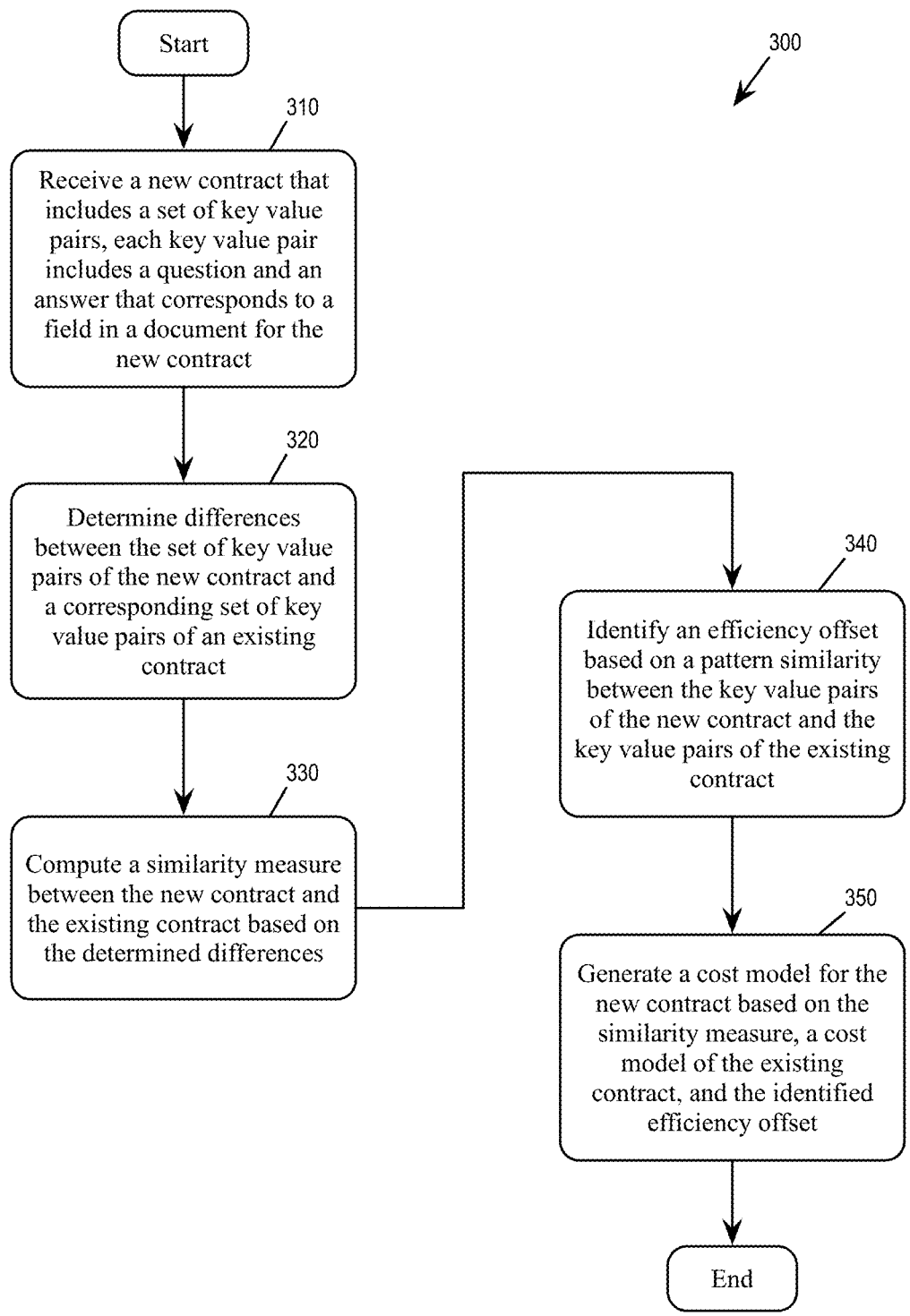
FIG. 3 conceptually illustrates a process for determining a cost model for a new contract based on an existing contract, consistent with an exemplary embodiment.

FIG. 3 conceptually illustrates a process 300 for determining a cost model for a new contract based on an existing contract, consistent with an exemplary embodiment. In some embodiments, one or more processing units (e.g., processor) of a computing device implementing the contract generation system 100 perform the process 300 when comparing two contracts to generate a similarity measure and to generate the cost model based on the similarity measure.

The system starts the process 300 when it receives (at 310) a new contract that includes a set of key-value pairs. The new contract may be based on a template having holes that correspond to various fields of information. Each hole of the template is filled with an answer to a question. The question and the answer of the hole forms the key-value pair of the hole, with the question being the key and the answer being the value.

The system determines (at 320) the differences between the set of key-value pairs of the new contract and a corresponding set of key-value pairs of an existing contract. Each key-value pair of the new contract is compared with a key-value pair from the existing contract having the same key. In some embodiments, variance definitions define how the values in the corresponding key-value pairs of the two contracts are compared. The variance definitions may also define how the differences are mapped into numerical distance values. The system may select a set of variance definitions from multiple different sets of variance definitions that correspond to different domains.

The system computes (at 330) a similarity measure between the new contract and the existing contract based on the determined differences. The variance definitions may define the generation of the similarity measure based on the distance values from comparisons of the key-value pairs. The similarity measure may be one single value or a matrix of values. The similarity measure may be a distance value or similarity ratio.

The system identifies (at 340) an efficiency offset based on a pattern of similarity between the key-value pairs of the new contract and the key-value pairs of the existing contract. The system may identify the pattern of similarity based on whether the two contracts are identical in specific fields. In some embodiments, the system computes the efficiency offset based on formulas or instructions provided by a set of efficiency definitions. The efficiency definitions may specify which distance values or which key-value pairs to examine, and how to weigh the distance values of different fields of information. The system may select a set of efficiency definitions from multiple different sets of efficiency definitions that correspond to different domains.

The system generates (at 350) a cost model for the new contract based on the similarity measure, a cost model of the existing contract, and the identified efficiency offset. The system may compute the cost model for the new contract as a multiplication product of the cost model of the existing contract and the similarity measure. The system 100 may apply the identified efficiency offset to different components of the cost model according to formula and instructions provided by the set of efficiency definitions. The process 300 then ends.

The contract generation system 100 performs continuous cost analysis over time. Ongoing changes to a contract, e.g., due to negotiation, may uncover new charges or new discounts that are applicable to other contracts in the database 105, depending on the degree of similarity of the contracts. For example, a seemingly small change in the cost model of a first contract may significantly increase its distance value with a second contract. If the cost model of the second contract is derived based on the cost model of first contract, the large change in the distance value with the first contract may cause the contract generation system 100 to change the cost model of the second contract.

Figure 4:
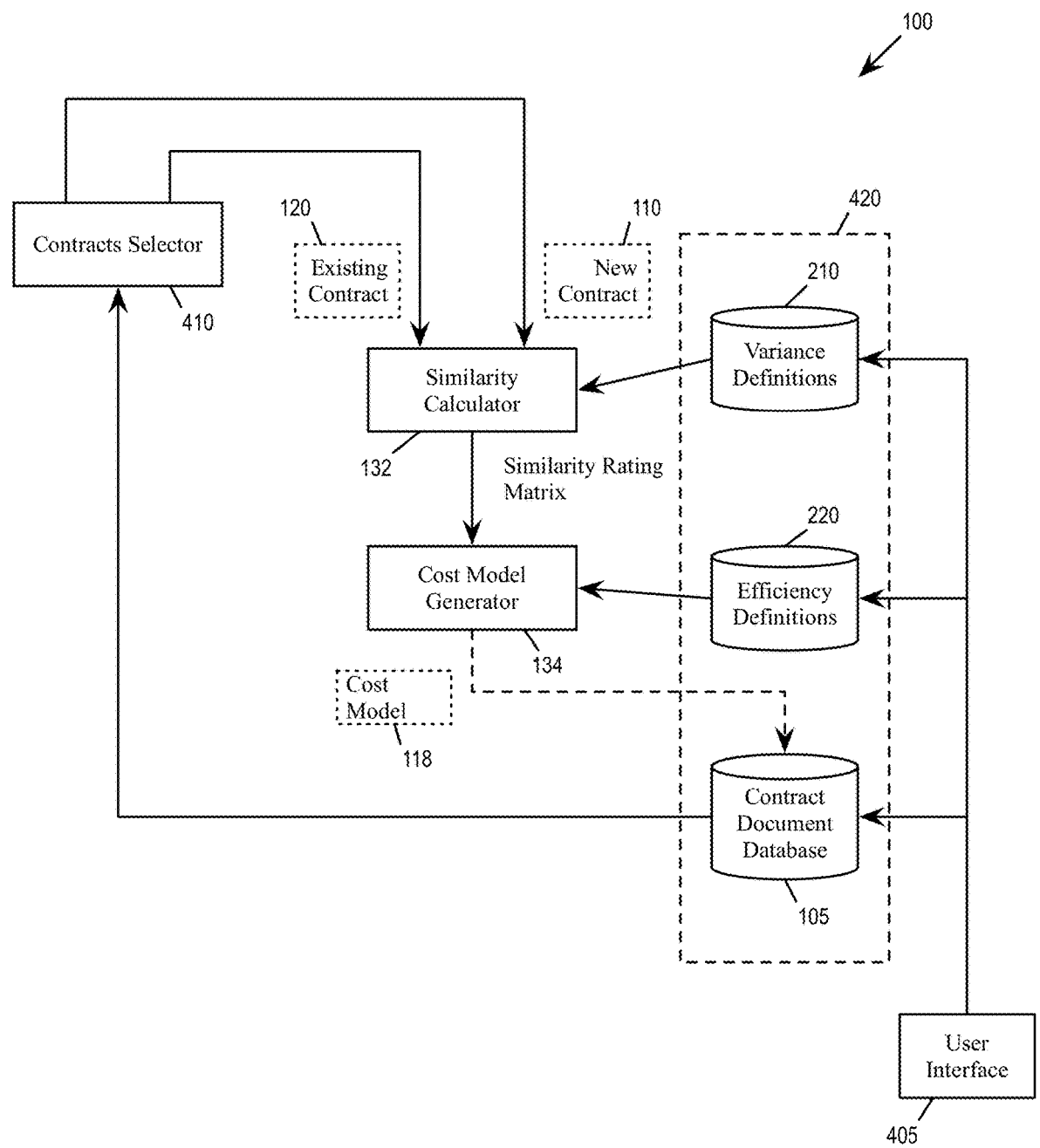
FIG. 4 illustrates automatic cost model update and propagation in the contract generation system, consistent with an exemplary embodiment.

FIG. 4 illustrates automatic cost model update and propagation in the contract generation system 100 of FIG. 1. As illustrated, the contract generation system 100 includes the similarity calculator 132, the cost model generator 134, a contract selector 410, a user interface 405, and a document storage 420 for storing the contract document database 105, the variance definitions 210, and the efficiency definitions 220. The user interface 405 allows user access to the contract document database 105, the variance definitions 210, and the efficiency definitions 220. The contracts selector 410 select a first contract (e.g., the existing contract 120) and a second contract (e.g., the new contract 110) from the contract document database 105. The similarity calculator 132 compares the two contracts and the cost model generator 134 generates a cost model (e.g., the cost model 118) for the second contract, based on the variance definitions 210 and the efficiency definitions 220. The newly generated cost model may be stored into the contract document database 105 to be the cost model of the second contract.

In some embodiments, the modules 132, 134, 405, 410, 420 are modules of software instructions being executed by one or more processing units (e.g., a processor) of a computing device. In some embodiments, the modules 132, 134, 405, 410, 420 are modules of hardware circuits implemented by one or more integrated circuits (ICs) of an electronic apparatus. Although the modules 132, 134, 405, 410, 420 are illustrated as being separate modules, some of the modules can be combined into a single module. For example, the functionalities of similarity calculator 132 and the cost model generator 134 can be merged as one contract comparator module. An example computing device 700 that may implement the contract generation system 100 will be described by reference to FIG. 7 below.

The user interface 405 allows the system 100 to receive an update to its contract document database 105. The system 100 may receive new contracts with new cost models. The system 100 may receive an update to the variance definitions 210 and the efficiency definitions 220. The system may also receive new versions of existing contracts with updated cost models. In some embodiments, when the contract generation system 100 receives an update, the system 100 automatically propagates the changes to the contracts stored in the contract document database 105 by searching for contracts with cost models that are affected by the change.

The contract selector 410 selects contracts from the database 105 for comparison and cost generation. When a new contract is added to the database 105, the contract selector 410 retrieves different existing contracts for comparison with the new contract. When other updates are made to the system 100 (e.g., changes to the variance definitions 210 or the efficiency definitions 220), the contract selector 410 searches the database 105 for contracts having cost models that are affected by the change.

The document storage 420 stores various sets of variance definitions and efficiency definitions for different domains of contracts. The document storage 420 also stores different contracts and their various versions as the contract document database 105. In some embodiments, the various contract documents are stored in the document storage 420 using blockchain, where each document is pushed to the blockchain or the hash of each document is calculated and pushed to the blockchain. In some embodiments, each new version of each document is pushed to the blockchain.

Figure 5:
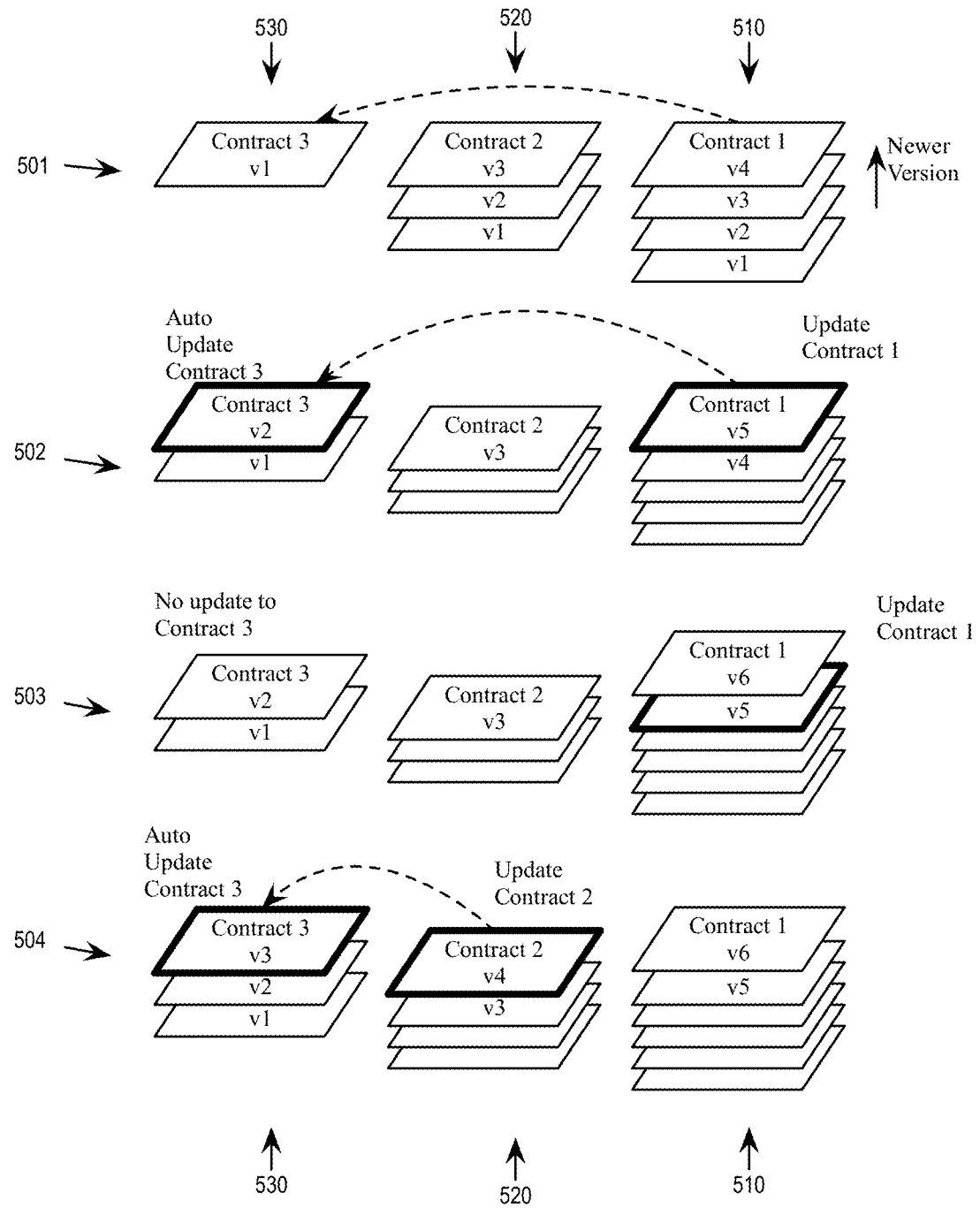
FIG. 5 conceptually illustrates the propagation of updates in the contract generation system, consistent with an exemplary embodiment.

In some embodiments, each revision or update to a contract is stored as a newer version of the contract in the database. The newer version of the contract may have a newer cost model that can be used to update other contracts. FIG. 5 conceptually illustrates the propagation of updates in the contract generation system 100, consistent with an exemplary embodiment. In four stages 501-504, the figure illustrates the propagation of updates among three different contracts 510, 520, and 530 (contract 1, contract 2, and contract 3).

The first stage 501 shows the generation of the new contract 530. At this stage, updates have been made to contracts 510 and 520 such that the database 105 stores four versions of the contract 510 (v1-v4 of contract 1) and three versions of the contract 520 (v1-v3 of contract 2). The cost model of the new contract 530 is generated based on the cost model of the last version (v4) of the contract 510.

The second stage 502 illustrates an update to the contract 510 (v5 of contract 1). The updated version of contract 510 still have a high degree of similarity (e.g., distance value smaller than a threshold) with the new contract 530. The system 100 then automatically creates a new version of the contract 530 (v2 of contract 3) with a new cost model that is derived based on the latest version of the contract 510.

The third stage 503 shows another update to the contract 510 (v6 of contract 1). The updated version of the contract 510 has low degree of similarity (e.g., distance values larger than a threshold) with the contract 530. Though the latest version of contract 530 (v2 of contract 3) is derived from the cost mode of the previous version of the contract 510, the system 100 does not automatically create a new version of the contract 530.

The fourth stage 504 shows an update to the contract 520 (v4 of contract 2). The updated version of the contract 520 has a high degree of similarity (e.g., distance value smaller than a threshold) with the latest version of the contract 530. The system 100 therefore creates a new version of the contract 530 (v3 of contract 3) with a new cost model that is derived based on the latest version of the contract 520. The system 100 generates a new version of the contract 530 with a new cost model because a newer contract (v4 of contract 2) that is sufficiently similar to the contract 530 has been added to the database.

Figure 6:
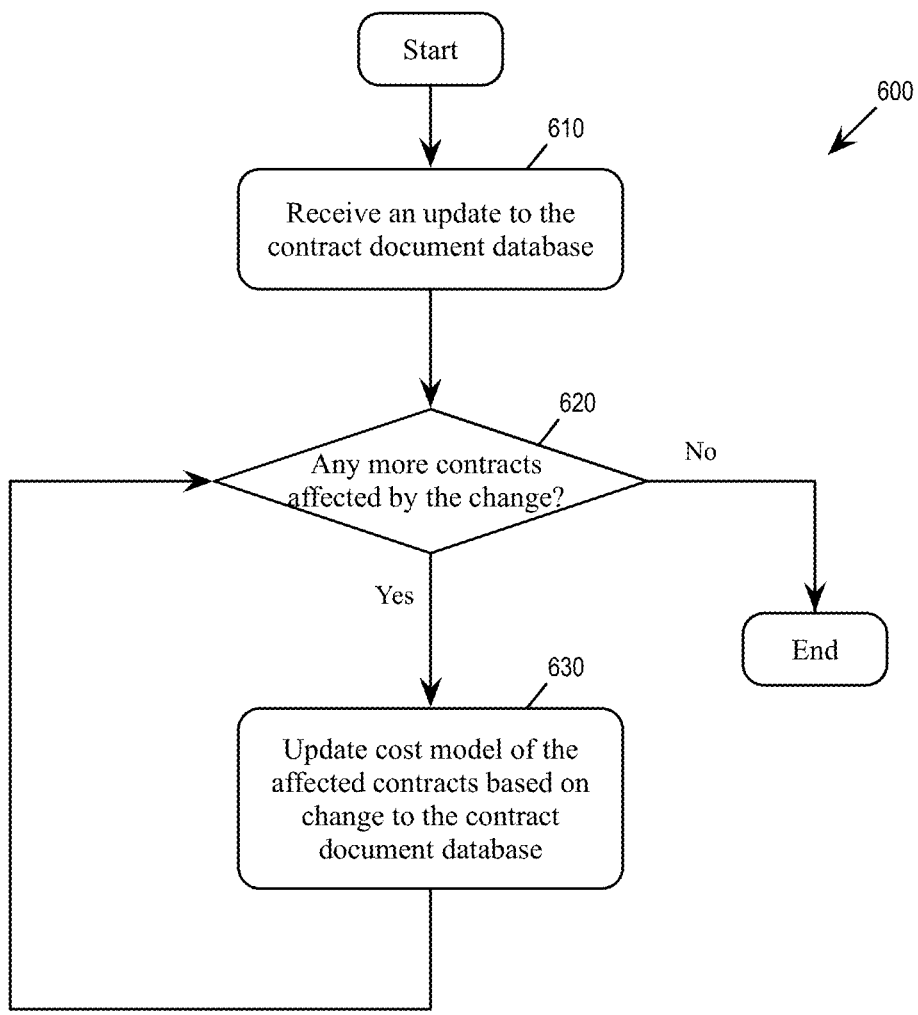
FIG. 6 conceptually illustrates a process for propagating updates in a contract generation system, consistent with an exemplary embodiment.

FIG. 6 conceptually illustrates a process 600 for propagating updates in a contract generation system, consistent with an exemplary embodiment. In some embodiments, one or more processing units (e.g., processor) of a computing device implementing the contract generation system 100 perform the process 600 by executing instructions stored in a computer readable medium.

The contract generation system 100 starts the process 600 when it receives (at 610) an update to the contract document database. The update may be the addition of a new contract to the database, an update to an existing contract in the database, a modification to the variance definitions, a modification to efficiency offset, etc.

The contract generation system 100 determines (at 620) whether any contract is affected by the change. The system 100 may keep a record of dependencies such that, for each contract in the database, the system would know which set of variance definitions, which set of efficiency definitions, and which cost model is used to determine the cost model of the contract. The system 100 may therefore use the record of dependencies to identify contracts that are affected by an update. In some embodiments, when a contract is added to the system or when a contract in the system is modified, the system 100 examines the database to identify one or more existing contracts that have high degree of similarity with the newly added or modified contract and to mark the identified existing contracts as being affected by the update. The contract generation system 100 may notify the user and prompt the user for permission to modify the affected contracts. If no contract is affected by the update or allowed to be modified, the process 600 ends. If there is at least one contract that is affected by the update but has yet to be updated by the system, the process proceeds to 630.

The contract generation system 100 updates (at 630) the cost models of the affected contracts based on the change to the contract. If the update is the addition of a new contract or modification of an existing contract, the system recalculates the similarity measure and/or re-generates the cost model for each affected contract based on the newly added or modified contract. If the update is made to a set of variance definitions or a set of efficiency definitions, the system 100 may recalculate the similarity measure and/or re-generate the cost model for each affected contract (by e.g., finding another contract that has a higher degree similarity according to the updated variance definitions or a cost model with lower cost according to the updated efficiency definitions.) The modified contracts with the updated cost models are then marked as being already updated and no longer affected by the update. The process then proceeds to 620 to determine if any other contracts are affected by the changes made at step 630 and to make further changes to those other contracts.

By computing the differences between key-value pairs of contracts, the contract generation system 100 is able to automatically identify a similar existing contract from a database of contracts and to automatically generate a cost model for a new contract. The ability to compare contracts also allows any update to be automatically propagated to contracts in the database.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 3 and 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
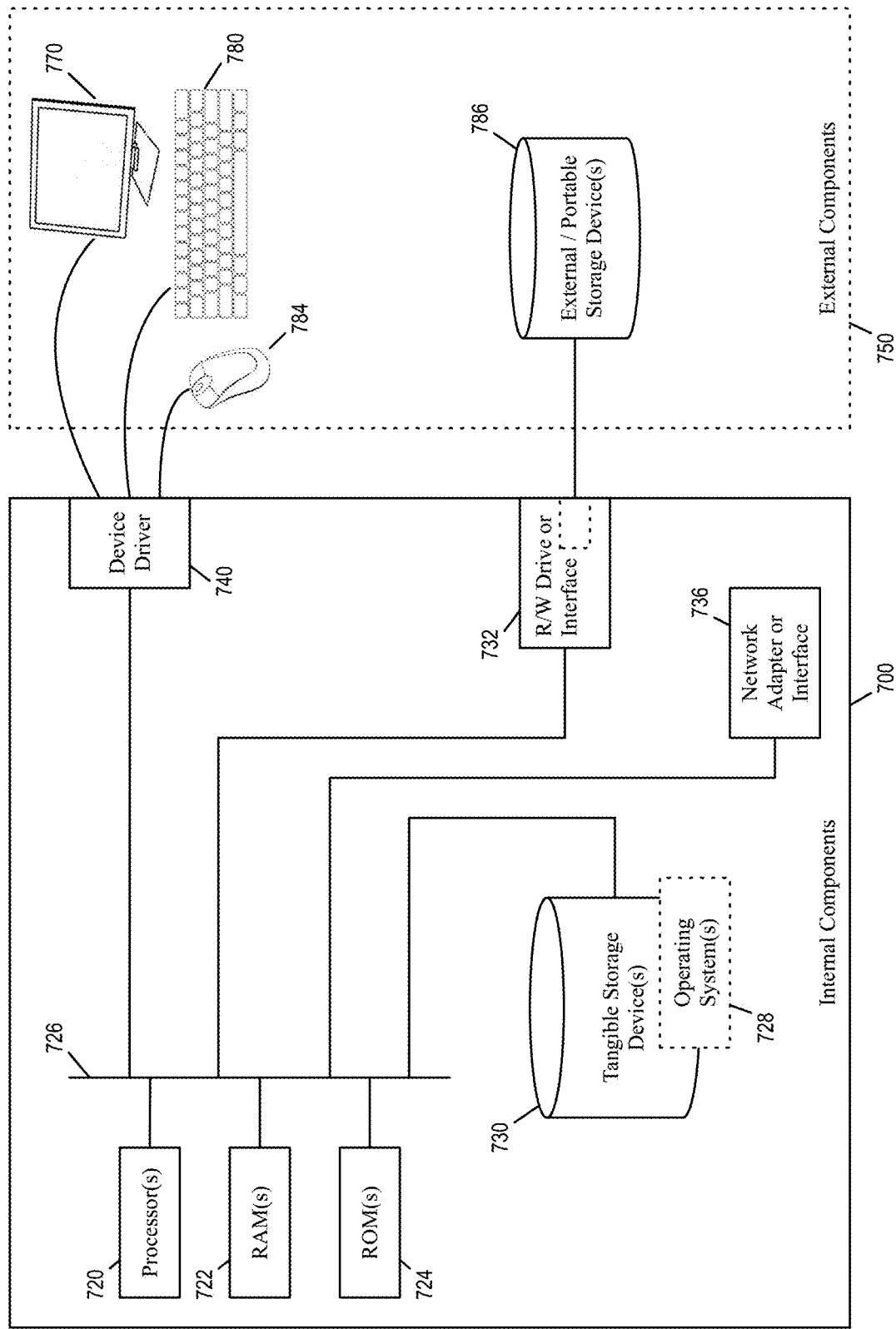
FIG. 7 shows a block diagram of the components of a data processing system in accordance with an illustrative embodiment of the present disclosure.

FIG. 7 shows a block diagram of the components of data processing systems 700 and 750 that may be used to implement the contract generation system 100 in accordance with an illustrative embodiment of the present disclosure. It should be appreciated that FIG. 7 provides only an illustration of one implementation and does not imply any limitations with regard to the Page 14 environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 700 and 750 may include a set of internal components 700 and a set of external components 750 illustrated in FIG. 7. The set of internal components 700 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the processes 400 and 600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal components 700 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the processes 400 and 600 can be stored on one or more of the respective portable computer-readable tangible storage devices 786, read via the respective R/W drive or interface 732 and loaded into the respective hard drive 730.

The set of internal components 700 may also include network adapters (or switch port cards) or interfaces 736 such as a TCP/IP adapter cards, wireless Wi-Fi interface cards, or 3G or 4G wireless interface cards or other wired or wireless communication links. Instructions of processes or programs described above can be downloaded from an external computer (e.g., server) Page 15 via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 750 can include a computer display monitor 770, a keyboard 780, and a computer mouse 784. The set of external components 750 can also include touch screens, virtual keyboards, touch pads, pointing devices, and other human interface devices. The set of internal components 700 also includes device drivers 740 to interface to computer display monitor 770, keyboard 780 and computer mouse 784. The device drivers 740, R/W drive or interface 732 and network adapter or interface 736 comprise hardware and software (stored in storage device 730 and/or ROM 724).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 8:
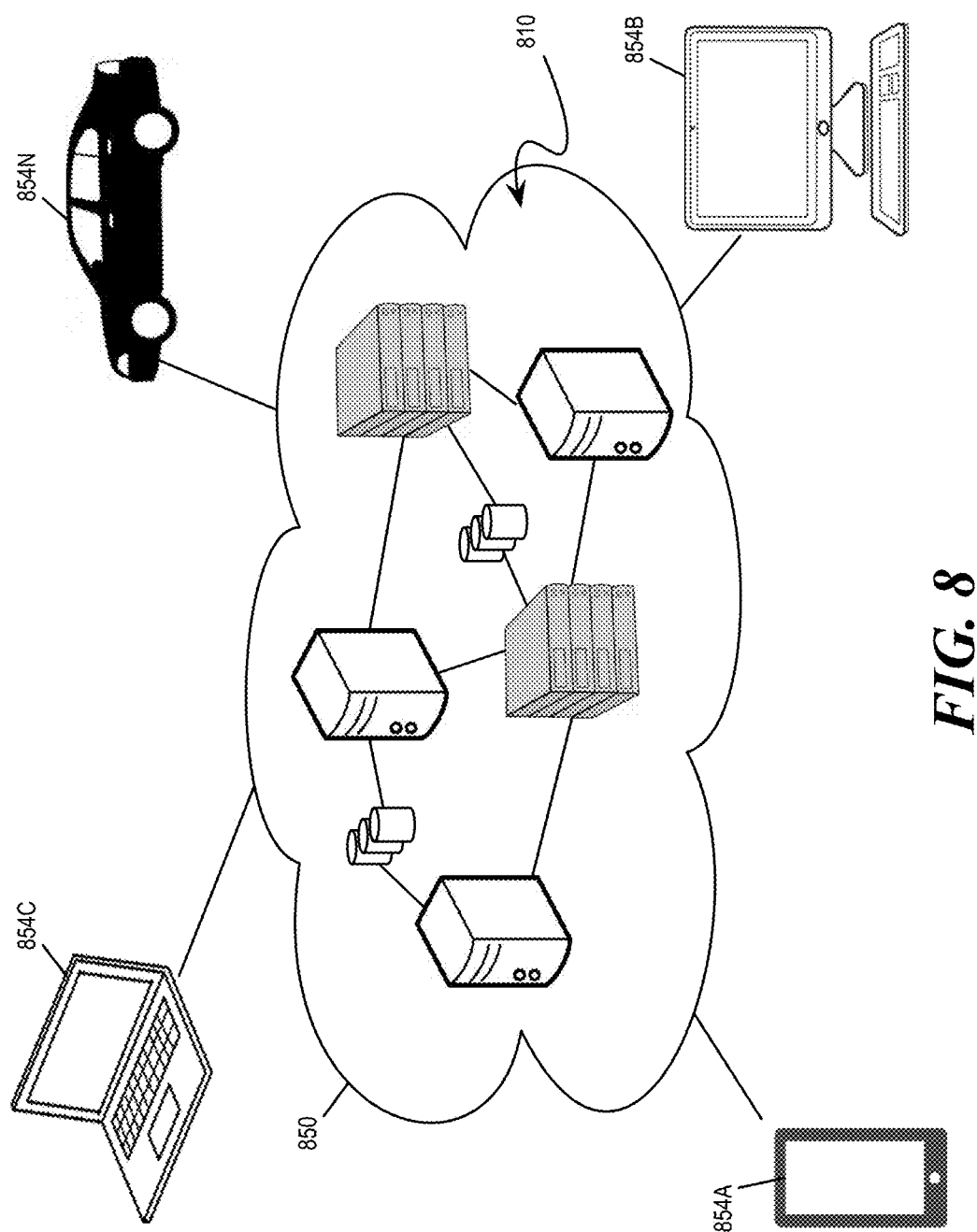
FIG. 8 illustrates an example cloud-computing environment.

Referring now to FIG. 8, an illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
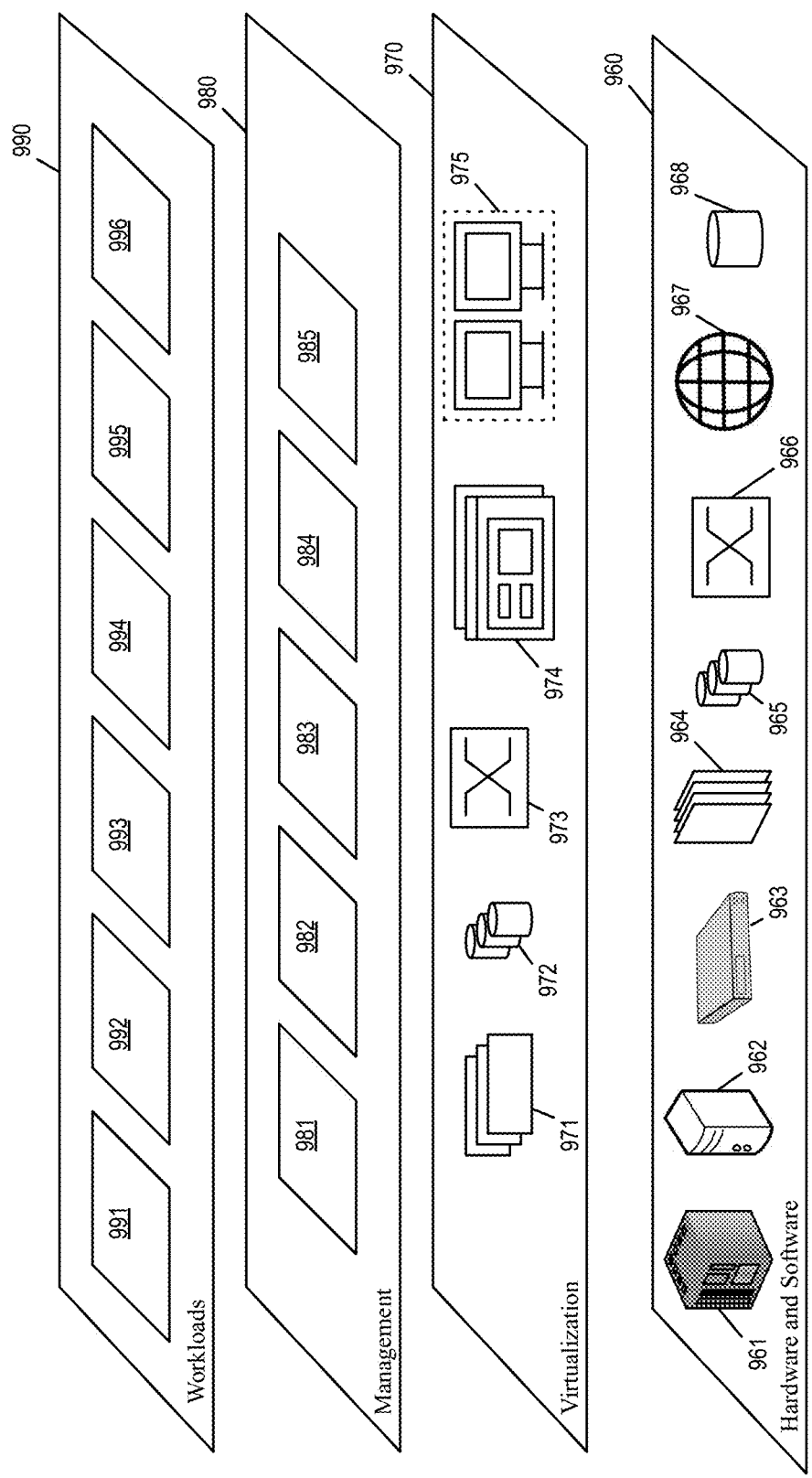
FIG. 9 illustrates a set of functional abstraction layers provided by a cloud-computing environment, consistent with an exemplary embodiment.

Referring now to FIG. 9, a set of functional abstraction layers provided by cloud computing environment 850 (of FIG. 8) is shown. It should be understood that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud-computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and contract comparison and generation 996. In some embodiments, the workload 996 performs some of the operations of the contract generation system 100.

The foregoing one or more embodiments implements a contract generation system within a computer infrastructure by having one or more computing devices compute distance values and similarity measures between different contracts. The computer infrastructure is further used to generate cost models based on the computed similarity measures and to propagate updates in a database of contracts The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:
receiving a new contract comprising a set of key-value pairs, each key-value pair comprising a question and an answer that correspond to a field of information in a document for the new contract;
computing a similarity measure between the new contract and an existing contract based on a set of variance definitions for determining differences between the set of key-value pairs of the new contract and a corresponding set of key-value pairs of the existing contract;
generating a cost model of the new contract based on the similarity measure and a cost model of the existing contract; and
updating the cost model of the new contract upon determining that a new version of the existing contract has been created and a similarity measure between the new version of the existing contract and the new contract is above a predetermined threshold.

2. The computing device of claim 1, wherein the new contract is generated based on a template having paragraphs with holes that correspond to fields of information.

3. The computing device of claim 1, wherein the set of variance definitions comprises instructions for computing (i) distance values between corresponding key-value pairs of the new contract document and of the existing contract document and (ii) the similarity measure based on the distance values.

4. The computing device of claim 1, wherein the set of variance definitions comprises mappings for non-numerical terms to numerical values in a context of a domain type of the new contract document.

5. The computing device of claim 1, wherein the set of variance definitions is identified from a plurality of sets of variance definitions based on a domain type of the new contract document.

6. The computing device of claim 1, wherein generating the cost model of the new contract document comprises:
determining an efficiency offset based on a pattern of similarity between the key-value pairs of the new contract and the key-value pairs of the existing contract; and
applying the determined efficiency offset to the cost model of the new contract.

7. The computing device of claim 1, wherein:
the existing contract is a first existing contract; and
the computing device is further configured to perform acts comprising:
identifying a second existing contract based on a similarity measure between the new contract and the second existing contract; and
generating an updated cost model for the second existing contract based on the cost model of the new contract.

8. A computer program product comprising:
one or more non-transitory computer-readable storage devices and program instructions stored on at least one of the one or more non-transitory storage devices, the program instructions executable by a processor, the program instructions comprising sets of instructions for:
receiving a new contract comprising a set of key-value pairs, each key-value pair comprising a question and an answer that correspond to a field of information in a document for the new contract;
computing a similarity measure between the new contract and an existing contract based on a set of variance definitions for determining differences between the set of key-value pairs of the new contract and a corresponding set of key-value pairs of the existing contract;
generating a cost model of the new contract based on the similarity measure and a cost model of the existing contract; and
updating the cost model of the new contract upon determining that a new version of the existing contract has been created and a similarity measure between the new version of the existing contract and the new contract is above a predetermined threshold.

9. The computer program product of claim 8, wherein the new contract is generated based on a template having paragraphs with holes that correspond to fields of information.

10. The computer program product of claim 8, wherein the set of variance definitions comprises instructions for computing (i) distance values between corresponding key-value pairs of the new contract document and of the existing contract document and (ii) the similarity measure based on the distance values.

11. The computer program product of claim 8, wherein the set of variance definitions comprises mappings for non-numerical terms to numerical values in a context of a domain type of the new contract document.

12. The computer program product of claim 8, wherein the set of variance definitions is identified from a plurality of sets of variance definitions based on a domain type of the new contract document.

13. The computer program product of claim 8, wherein generating the cost model of the new contract document comprises:

determining an efficiency offset based on a pattern of similarity between the key-value pairs of the new contract and the key-value pairs of the existing contract; and applying the determined efficiency offset to the cost model of the new contract.

14. The computer program product of claim 8, wherein:

the existing contract is a first existing contract; and the program instructions further comprising sets of instructions for:

identifying a second existing contract based on a similarity measure between the new contract and the second existing contract; and generating an updated cost model for the second existing contract based on the cost model of the new contract.

15. A computer-implemented method comprising:

receiving a new contract comprising a set of key-value pairs, each key-value pair comprising a question and an answer that correspond to a field of information in a document for the new contract;

computing a similarity measure between the new contract and an existing contract based on a set of variance definitions for determining differences between the set of key-value pairs of the new contract and a corresponding set of key-value pairs of the existing contract;

generating a cost model of the new contract based on the similarity measure and a cost model of the existing contract; and updating the cost model of the new contract upon determining that a new version of the existing contract has been created and a similarity measure between the new version of the existing contract and the new contract is above a predetermined threshold.

16. The computer-implemented method of claim 15, wherein the set of variance definitions comprises instructions for computing (i) distance values between corresponding key-value pairs of the new contract document and of the existing contract document and (ii) the similarity measure based on the distance values.

17. The computer-implemented method of claim 15, wherein the set of variance definitions comprises mappings for non-numerical terms to numerical values in a context of a domain type of the new contract document.

18. The computer-implemented method of claim 15, wherein the set of variance definitions is identified from a plurality of sets of variance definitions based on a domain type of the new contract document.

19. The computer-implemented method of claim 15, wherein generating the cost model of the new contract document comprises:

determining an efficiency offset based on a pattern of similarity between the key-value pairs of the new contract and the key-value pairs of the existing contract; and applying the determined efficiency offset to the cost model of the new contract.

20. The computer-implemented method of claim 15, wherein the existing contract is a first existing contract, the method further comprising:

identifying a second existing contract based on a similarity measure between the new contract and the second existing contract; and generating an updated cost model for the second existing contract based on the cost model of the new contract.

* * * * *